(12) United States Patent
Karaki et al.

(10) Patent No.: US 11,898,604 B2
(45) Date of Patent: Feb. 13, 2024

(54) BALL BEARING

(71) Applicant: MINEBEA MITSUMI Inc., Nagano (JP)

(72) Inventors: Tadahiko Karaki, Nagano (JP); Hirotaka Tohyama, Nagano (JP); Kunihiro Matsumoto, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 336 days.

(21) Appl. No.: 17/383,584

(22) Filed: Jul. 23, 2021

(65) Prior Publication Data
US 2021/0348649 A1 Nov. 11, 2021

Related U.S. Application Data

(63) Continuation-in-part of application No. PCT/JP2020/023138, filed on Jun. 12, 2020.

(30) Foreign Application Priority Data

Jun. 25, 2019 (JP) .................................. 2019-117325

(51) Int. Cl.
*F16C 33/44* (2006.01)
*F16C 33/38* (2006.01)
(Continued)

(52) U.S. Cl.
CPC ................ *F16C 33/44* (2013.01); *C08K 7/06* (2013.01); *C08L 71/00* (2013.01);
(Continued)

(58) Field of Classification Search
CPC .............. F16C 33/3837; F16C 33/3843; F16C 33/3856; F16C 33/416; F16C 33/44; F16C 33/498
See application file for complete search history.

(56) References Cited

U.S. PATENT DOCUMENTS 8,931,960 B2 * 1/2015 Damato ................ F16C 33/583
384/477
2002/0051596 A1 5/2002 Yamamoto et al.
(Continued)

FOREIGN PATENT DOCUMENTS

CN 105247231 A 1/2016
CN 107252888 A 10/2017
(Continued)

OTHER PUBLICATIONS

German Office Action dated Sep. 16, 2022 for corresponding German Application No. 112020003036.9 and English Translation.
(Continued)

*Primary Examiner* — James Pilkington
(74) *Attorney, Agent, or Firm* — Pearne & Gordon LLP

(57) ABSTRACT

A ball bearing includes an inner ring; an outer ring placed outside of the inner ring; a plurality of rolling bodies intervening between the inner ring and the outer ring; and an annular cage including pockets rotatably holding the rolling bodies in a circumferential direction at intervals determining a rotation axis to be a center. The cage comprises a resin composition comprising a polyetherketone-based resin, graphite, and a carbon fiber. The resin composition comprises the polyetherketone-based resin in an amount of 60% by weight or more and 80% by weight or less, the graphite in an amount of 10% by weight or more and 30% by weight or less, and the carbon fiber in an amount of 5% by weight or more and 20% by weight or less when the entire resin composition is determined to be 100% by weight.

7 Claims, 8 Drawing Sheets

(51) Int. Cl.
  *F16C 33/41* (2006.01)
  *F16C 19/06* (2006.01)
  *C08L 71/00* (2006.01)
  *C08K 7/06* (2006.01)
  *F16C 19/16* (2006.01)

(52) U.S. Cl.
  CPC ........ *F16C 33/3856* (2013.01); *F16C 33/416* (2013.01); *F16C 19/06* (2013.01); *F16C 19/16* (2013.01); *F16C 2208/02* (2013.01); *F16C 2208/36* (2013.01); *F16C 2316/13* (2013.01)

(56) References Cited

U.S. PATENT DOCUMENTS

| | | |
|---|---|---|
| 2002/0168125 A1 | 11/2002 | Kahlman et al. |
| 2008/0159676 A1 | 7/2008 | Nagai et al. |
| 2015/0139847 A1 | 5/2015 | Ito et al. |
| 2016/0108965 A1 | 4/2016 | Kokumai et al. |
| 2019/0032714 A1 | 1/2019 | Ito et al. |
| 2019/0203770 A1 | 7/2019 | Ishii et al. |
| 2019/0345980 A1 | 11/2019 | Ishii et al. |

FOREIGN PATENT DOCUMENTS

| | | |
|---|---|---|
| DE | 10 2015 211 635 A1 | 12/2016 |
| EP | 3153728 * | 4/2017 |
| JP | 11-37162 A | 2/1999 |
| JP | 2000-065068 A | 3/2000 |
| JP | 2002-213455 A | 7/2002 |
| JP | 2015-021551 A | 2/2015 |
| JP | 2018-025288 A | 2/2018 |
| JP | 2018-054111 A | 4/2018 |
| WO | 2006/062115 A1 | 6/2006 |

OTHER PUBLICATIONS

Chinese Office Action dated Mar. 2, 2022 for corresponding Chinese Application No. 202080036831.8 and English translation.
Notification to Grant Patent Right for Invention dated Jul. 12, 2022 for corresponding Chinese Application No. 202080036831.8 and English translation.
English translation of the Written Opinion for corresponding International Application No. PCT/JP2020/023138 dated Jul. 14, 2020.
International Search Report for corresponding International Application No. PCT/JP2020/023138 dated Jul. 14, 2020.
Written Opinion for corresponding International Application No. PCT/JP2020/023138 dated Jul. 14, 2020.
Decision to Grant a Patent for corresponding Japanese Application No. 2020-542168 dated Sep. 15, 2020 and English translation.

* cited by examiner

BALL BEARING

CROSS-REFERENCE TO RELATED APPLICATION(S)

This application is a continuation-in-part of PCT International Application No. PCT/JP2020/023138 filed on Jun. 12, 2020 which claims the benefit of priority from Japanese Patent Application No. 2019-117325 filed on Jun. 25, 2019, the entire contents of which are incorporated herein by reference.

BACKGROUND OF THE INVENTION

1. Field of the Invention

The present invention relates to a ball bearing.

2. Description of the Related Art

Conventionally, dental handpieces have been used in dental treatment and the like. In addition, the above dental handpiece usually includes a head including a rotation mechanism and a tool detachably attached to the head. In the above rotation mechanism, a ball bearing including an inner ring, an outer ring, a plurality of rolling bodies (balls) intervening between the inner ring and the outer ring, and a cage holding the rolling bodies is used. In Japanese Patent Application Publication Laid-open No. H11-37162, such a cage is molded using a molding material prepared by mixing a base resin having heat resistance, a filler, and a lubricating oil.

The dental handpiece is repeatedly sterilized by boiling after each use and thus the cage of the ball bearing used for the rotation mechanism thereof is required to be less likely to deteriorate even when the cage is repeatedly placed under a high temperature and high humidity environment. In addition, the cage is also required to have the strength and lifetime for enduring high-speed rotations. In addition, ball bearings for high-speed rotations used for other than the dental handpiece are also required to have the above properties.

The present invention is made to solve the above problems and an object of the present invention is to provide a ball bearing including a cage that can reduce strength deterioration under a high temperature and high humidity environment while the required strength is being secured and, in addition, has a long lifetime.

SUMMARY OF THE INVENTION

The present invention is made to solve the above problems and an object of the present invention is to provide a ball bearing including a cage that can reduce strength deterioration under a high temperature and high humidity environment while the required strength is being secured and, in addition, has a long lifetime.

To solve the problem and to achieve the objective, a ball bearing according to one aspect of the present invention comprises an inner ring; an outer ring placed outside of the inner ring; a plurality of rolling bodies intervening between the inner ring and the outer ring; and an annular cage having a rotation axis, the cage including pockets rotatably holding the rolling bodies in a circumferential direction at intervals, wherein the cage comprises a resin composition comprising a polyetherketone-based resin, graphite, and a carbon fiber; the resin composition comprises the polyetherketone-based resin in an amount of 60% by weight or more and 80% by weight or less, the graphite in an amount of 10% by weight or more and 30% by weight or less, and the carbon fiber in an amount of 5% by weight or more and 20% by weight or less when the entire resin composition is determined to be 100% by weight; and an area ratio is defined by a ratio of an area occupied by graphite having a diameter of a circle to which a particle internally contacts of 30 μm or more relative to a total area occupied by the graphite wherein the area ratio is 10% to 20%.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments will be described in detail with reference to the attached drawings. The present invention, however, is not limited by the following embodiments at all.

Figure 1:
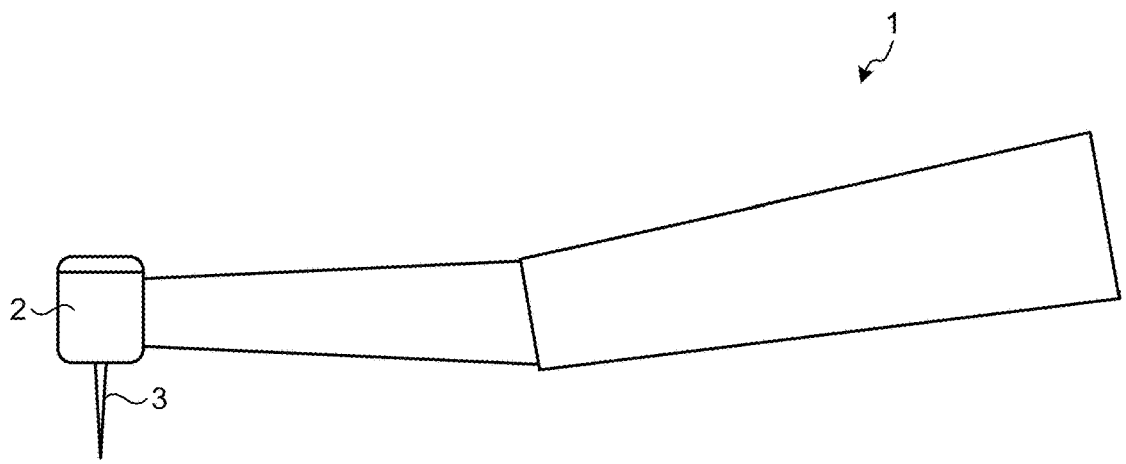
FIG. 1 is an appearance view of a dental handpiece.

The ball bearing according to the embodiment is a ball bearing for high-speed rotations suitably used for a dental handpiece. FIG. 1 is an appearance view of the dental handpiece, FIG. 2 is a cross-sectional view of the head section of the dental handpiece, FIG. 3 is a cross-sectional view of the ball bearing used for the head section, and FIG. 4 is a perspective view of a cage used for the ball bearing.

As illustrated in FIG. 1, the dental handpiece 1 includes the head section 2 having a rotation mechanism and a tool 3 detachably attached to the head section 2. At the time of using the dental handpiece 1, cutting or the like of teeth is performed by rotating the tool 3 at a high speed (for example, 400,000 rotations per minute).

Figure 2:
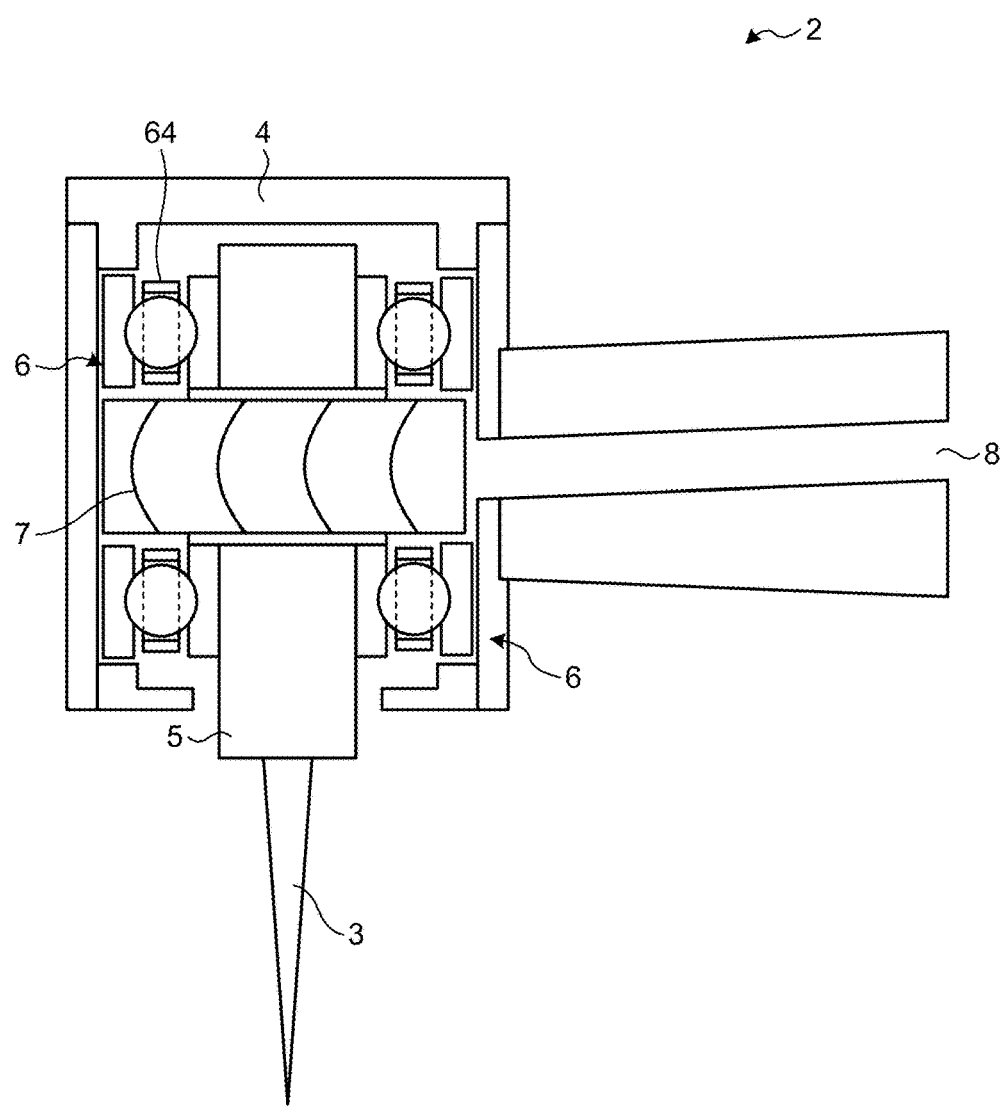
FIG. 2 is a cross-sectional view of the head section of the dental handpiece.

As illustrated in FIG. 2, the head section 2 of the dental handpiece 1 includes an axis member 5, a pair of ball bearings 6, a turbine blade 7, and an air supply port 8 together with the tool 3 in a housing 4. The tool 3 is attached to the axis member 5 and the axis member 5 is rotatably supported by the housing 4 through a pair of the upper and lower ball bearings 6 existing in the axial direction. Moreover, between a pair of the ball bearings 6, the turbine blade 7 is attached to the axis member 5. The turbine blade 7 rotates at a high speed by compressed air supplied from the air supply port 8 to the turbine blade 7. By this operation, the axis member 5 and the tool 3 can also rotate at a high speed.

Figure 3:
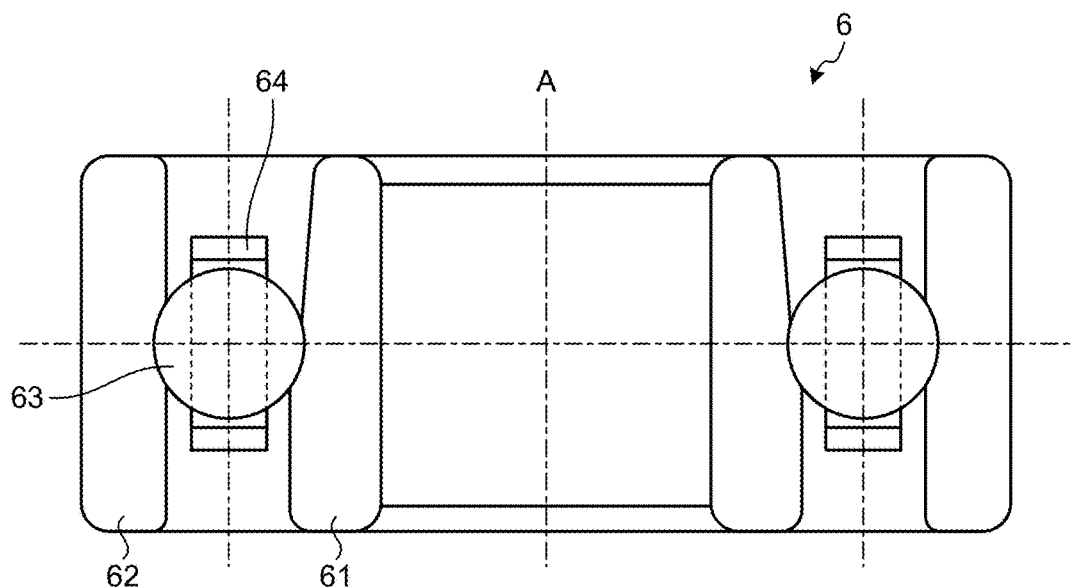
FIG. 3 is a cross-sectional view of a ball bearing used for the head section.
Figure 4:
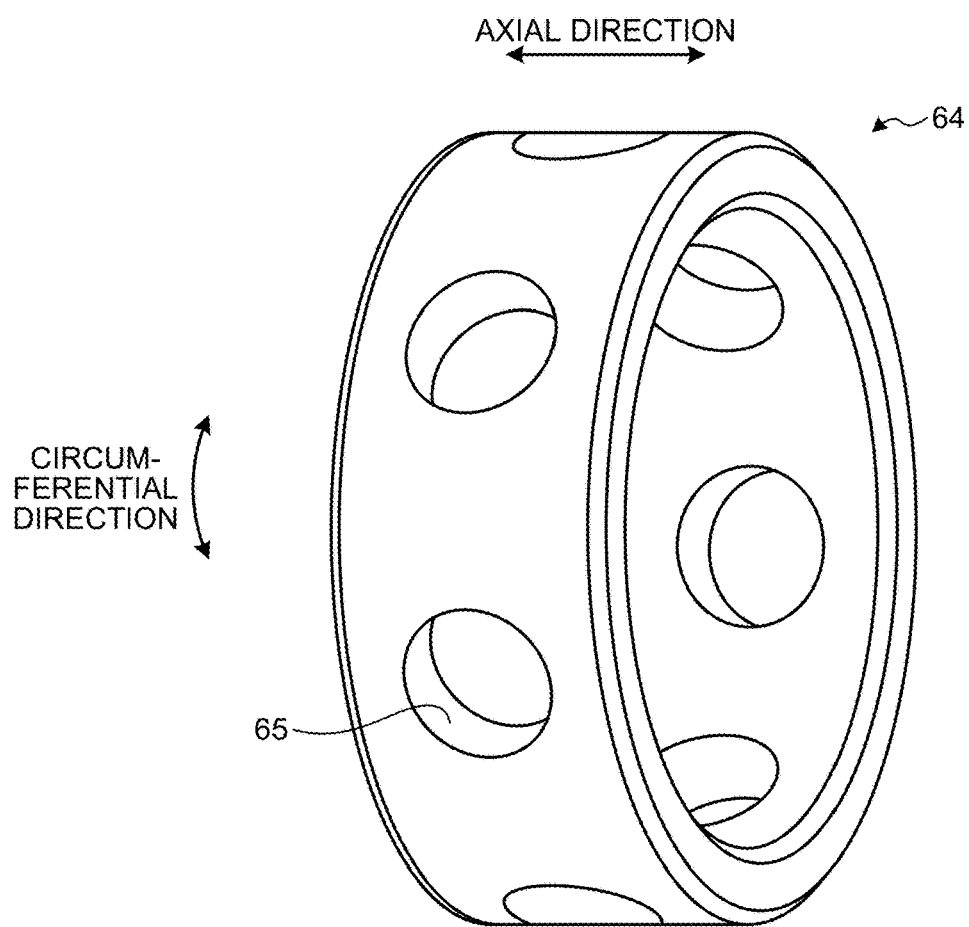
FIG. 4 is a perspective view of a cage used for the ball bearing.

As illustrated in FIG. 2 and FIG. 3, the ball bearing 6 includes an inner ring 61 having an inner ring raceway at an outer circumferential surface, an outer ring 62 having an outer ring raceway at an inner circumferential surface, a plurality of rolling bodies (balls) 63 intervening between the inner ring raceway and the outer ring raceway, and a cage 64 rotatably holding the rolling bodies 63 in a circumferential direction at intervals. The inner ring 61 and the outer ring 62 are formed from, for example, stainless steel and the rolling bodies 63 are formed from stainless steel or ceramic. As illustrated in FIG. 4, in the circular cage 64, a plurality of pockets 65 are provided in the circumferential direction at constant intervals for rotatably holding the rolling bodies 63.

The inner circumferential surface of the cage 64 is opposed to the outer circumferential surface of the inner ring 61 and the outer circumferential surface of the cage 64 is opposed to the inner circumferential surface of the outer ring 62. The outer ring 62 is internally fitted to the housing 4 and the inner ring 61 is externally fitted to the axis member 5. In the ball bearing 6, the inner ring 61 and the outer ring 62 are relatively rotatable around a rotation axis A. In other words, the inner ring 61 rotates in high speed relative to the outer ring 62 at the time of using the dental handpiece 1.

In the outer ring 62, a sealing member such as a sealing component and a shield may be provided in order to prevent leakage of a lubricant agent from the inside of the ball bearing 6 or penetration of foreign matters into the inside of the ball bearing 6.

The cage 64 will be further described in detail. The cage 64 is a machined cage including a polyetherketone-based resin as a base resin. Examples of the polyetherketone-based resin include polyaryletherketone such as polyetheretherketone, polyetherketoneetherketoneketone, and polyetherketone. Moreover, as the polyetherketone-based resin, a polyetherketone-based resin having a melting point of 370° C. or more and a glass transition point of 150° C. or more may be used from the viewpoint of improvement in heat resistance and improvement in mechanical strength under a high speed and high temperature environment. The melting point (that is, a peak melting temperature (Tpm)) can be determined by a method in accordance with JIS K 7121 (2012) using a differential scanning calorimeter (DSC). In addition, the glass transition point (that is, an extrapolated starting temperature of glass transition (Tig)) can be determined by a method in accordance with JIS K 7121 (2012) using a differential scanning calorimeter (DSC). As such a polyetherketone-based resin, specifically, a copolymer containing the structure unit represented by the following formula (1) and the structure unit represented by the following formula (2) is suitably used. In the composition ratio of the polymer formed of the structure unit represented by the following formula (1) and the polymer formed of the structure unit represented by the following formula (2) in the copolymer, the polymer formed of the structure unit represented by the following formula (2) is preferably contained in 50 mol % or more and more preferably contained in 70% or more relative to the entire structure units. The composition ratio is determined by NMR. The polymer formed of the structure unit represented by the following formula (2) as a homopolymer has a higher melting point and glass transition point than those of the polymer formed of the structure unit represented by the following formula (1) as a homopolymer. Therefore, the melting point and the glass transition point of the copolymer can be raised by increasing the composition ratio of the polymer formed of the structure unit represented by the following formula (2).

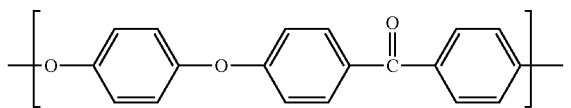

(1)

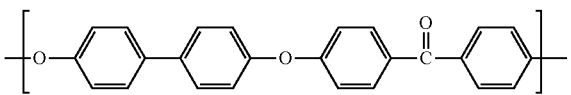

(2)

The polyetherketone-based resin may be used alone or may be used in combination of two or more of the resins. It is understood that resins "used in combination" described here refer to resins including various polymer blends and copolymers. Conventionally, as the base resin of the cage used for the ball bearing of the dental handpiece, polyamideimide (PAI) has been used. This polyamideimide has excellent heat resistance, a long durable lifetime, and high initial strength. Repeated sterilization by boiling (placed in a high temperature and high humidity environment) of the dental handpiece, however, results in promoting deterioration and thus reducing the strength due to hygroscopicity of an imide group constituting the resin. In contrast, use of the polyetherketone-based resin allows a reduction in the strength at the time of placing the polyetherketone-based resin in a high temperature and high humidity environment to be prevented.

Moreover, the cage 64 further includes particle graphite and a carbon fiber together with the polyetherketone-based resin. In the cage 64, the graphite is included in an amount of 10% by weight or more and 30% by weight or less and the carbon fiber is included in an amount of 5% by weight or more and 20% by weight or less. The cage 64 including the graphite in an amount of less than 10% by weight may shorten the lifetime. The cage 64 including the graphite in an amount of more than 30% by weight may not obtain the required strength due to a relatively lower ratio of the base resin. The cage 64 including the carbon fiber in the above range allows the strength to be suitably improved. As described above, the cage 64 includes both of the graphite and the carbon fiber as the carbon-based fillers and the total amount of the carbon-based fillers is 20% by weight or more to 40% by weight or less. The cage 64 including both of the graphite and the carbon fiber in the above ratios allows both providing a longer lifetime due to sliding property of the graphite and securing of the strength due to the carbon fiber to be satisfied.

From the viewpoint of satisfying both the strength and the lifetime, the polyetherketone-based resin is preferably included in an amount of 60% by weight or more to 80% by weight or less in the cage 64.

In addition, when a rectangular region that is a plane cutting an outer circumferential surface of the cage 64 in parallel with the rotation axis, is located between two adjacent pockets 65, is in contact with each of the pockets 65, and extends to both end surfaces in an axial direction is determined to be an observation region, an area ratio that is defined by a ratio of an area occupied by the graphite having a diameter (hereinafter, referred to as a maximum diameter) of a circle to which a particle internally contacts of 30 μm or more relative to a total area occupied by the graphite in the above observation region is 10% or more and 20% or less. The cage 64 including the graphite having a diameter of a circle to which a particle internally contacts of 30 μm or more in the above range allows a longer lifetime to be achieved. The observation region need not be a rectangular shape depending on the shape of the cage.

Figure 5:
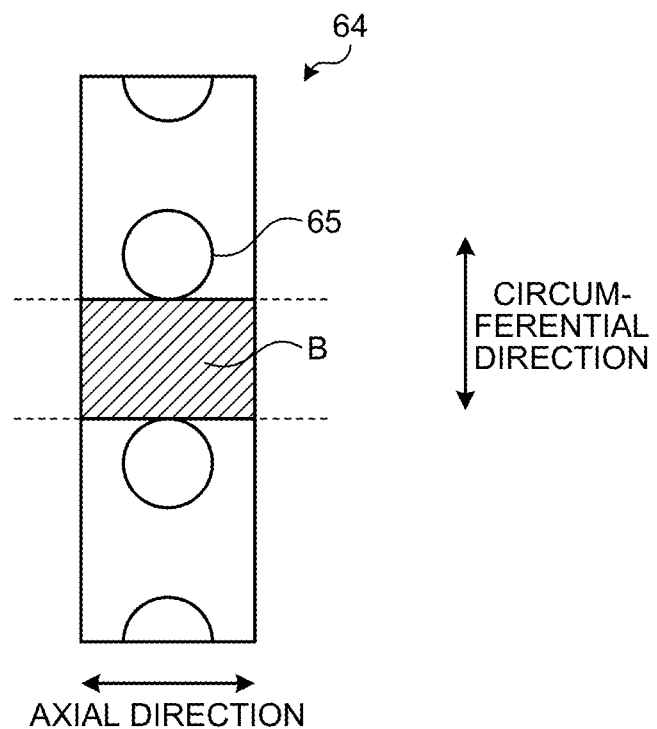
FIG. 5 is a view for illustrating an area ratio.
Figure 6:
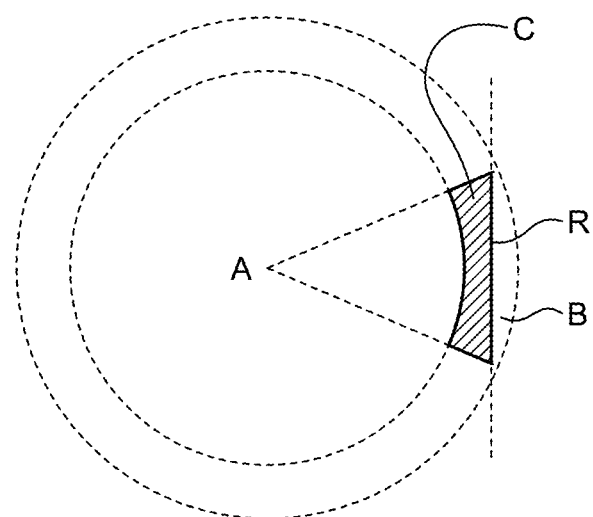
FIG. 6 is a view for illustrating an area ratio.

Here, how to determine the area ratio will be more specifically described. First, a sample for determining the area ratio is prepared as follows. FIG. 5 and FIG. 6 are views for illustrating the area ratio. FIG. 5 illustrates the case where the cage 64 is seen from a direction perpendicular to the axial direction of the cage 64 in FIG. 4. In addition, FIG. 6 illustrates the case where the sample prepared from the cage 64 is seen from a direction parallel to the axial direction of the cage 64 in FIG. 4. First, a part existing between adjacent two pockets 65 is cut out from the cage 64 to give a partial ring B (FIG. 5). Subsequently, the outer circumferential surface of the partial ring B is polished. At this time, the sample is polished in parallel with a tangent direction and in parallel with the axial direction to a virtual circle including the outer circumferential surface of the partial ring B to give a sample C (FIG. 6). In the sample C, the plane obtained by polishing is a plane cutting the outer circumferential surface of the cage 64 in parallel with the rotation axis that is the rectangular region existing in a position between the adjacent two pockets 65, is in contact with each of the pockets 65, and extends to both end surface in the axial direction. This rectangular region is determined to be the observation region R. The polishing is performed so that the thickness of the sample C (the shortest distance between the inner circumferential surface of the partial ring B and the observation region R) is ½ of the thickness of the cage 64.

Subsequently, the observation region R of the sample C is observed with a microscope. The maximum diameter of the observed graphite is a diameter of a circle to which the particle internally contacts. Then, a ratio of the area of the graphite having a maximum diameter of 30 μm or more relative to the total area occupied by the graphite in the observation region R is determined and the obtained value is determined to be the above area ratio.

At the time of observing the sample C with the microscope as described above, the carbon fiber is preferably oriented in the sample C in a direction corresponding to the axial direction in the cage 64 before the sample C is prepared. The orientation of the carbon fiber in the above direction allows the strength of the ball bearing to be improved. This is considered to be because although the rolling bodies collide to the wall surface of the pocket during high-speed rotations, the orientation of the carbon fiber in the above direction allows the force applied to the wall surface by the collision to be counteracted.

The cage 64 may further include additives. Examples of the additives may include solid lubricant agents, inorganic fillers, antioxidants, antistatic agents, mold release agents, and reinforcing fiber materials. Examples of the solid lubricant agents include polytetrafluoroethylene (PTFE), boron nitride, and melamine cyanurate. The amount of the additive is not particularly limited as long as the additive does not affect securement of the above-described mechanical strength and reduction effects in friction and abrasion. The additives may be included in an amount of 15% by weight or less in total in 100% by weight of the cage 64.

In the production of the cage 64, for example, first, the polyetherketone-based resin, the graphite (specifically, raw material graphite), and the carbon fiber are mixed so as to be the ratio in the above-described value range. The additives may be mixed, if necessary. These components are dry mixed with a mixer such as a Henschel mixer and a tumbler mixer.

Here, in order to control the ratio of the area occupied by the graphite having a maximum diameter of 30 μm or more in the above range, the raw material graphite including the graphite having a particle diameter of 30 μm or more is preferably used. This is because the particle diameter becomes smaller at the time of the above mixing. Specifically, the raw material graphite preferably has an average particle diameter in a range of 30 μm or more and 100 μm or less. The raw material graphite having the average diameter in the above range allows the above area ratio to be controlled in the above range because the graphite having a particle diameter of 30 μm or more is included in an appropriate amount. In order to control the above area ratio in the above range, it is also preferred to set the conditions of the above mixing adequately.

Subsequently, the mixed components are fed to an extrusion molding machine to melt and knead them under reduced pressure. The kneaded mixed components are extruded from the die at the tip of the extrusion molding machine in a bar-like shape and cooled to prepare a molding material such as a round bar. This molding material is subjected to cutting to be formed into a predetermined shape as the cage 64. The cutting operation performed after preparing the molding material as described above allows the direction of the carbon fiber to be aligned in the axial direction of the cage 64 as described above. The ball bearing 6 and the dental handpiece 1 are produced by the known methods using the obtained cage 64.

Figure 7:
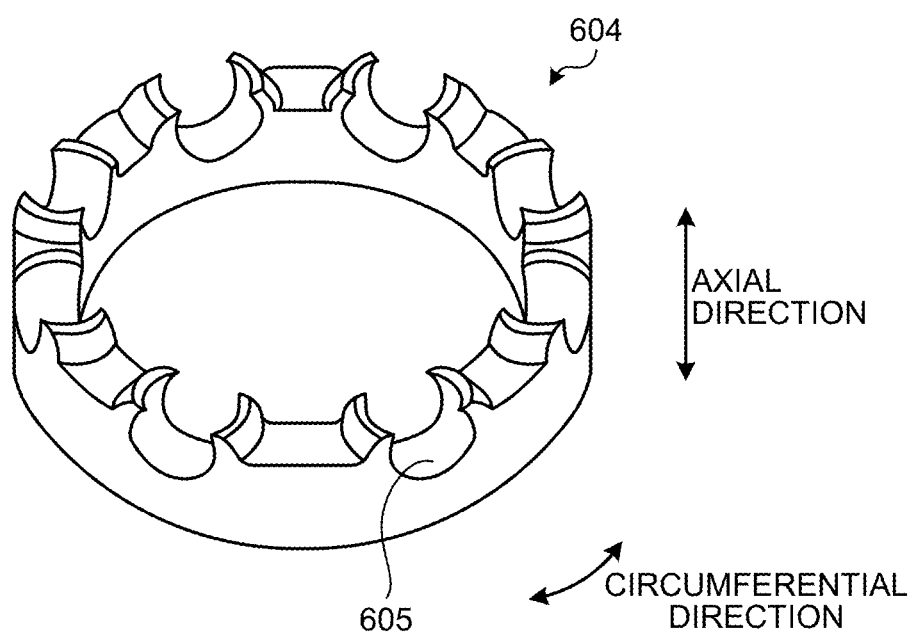
FIG. 7 is a perspective view of a snap cage used for the ball bearing.

The ball bearing according to the embodiment may be a ball bearing having a snap cage in addition to the ball bearing 6 having the cage 64 illustrated in FIG. 4. FIG. 7 is a perspective view of the snap cage used for the ball bearing. In the snap cage 604, a plurality of pockets 605 for rotatably holding the rolling bodies are included in the circumferential direction at constant intervals. The snap cage 604 is the same as the cage 64 except that the shape of the pocket is different. In other words, the snap cage 604 includes the specific components in the specific amounts as described above and the above area ratio are in the specific range. Therefore, the ball bearing 604 including the snap cage 604 also provides the same effect as the effect of the ball bearing 6.

The ball bearing according to the embodiment is suitably used for electric appliances such as cleaners and instruments such as spindles used for machine tools or the like in addition to the dental handpiece. The ball bearing according to the embodiment has excellent strength and a lifetime at the time of a high-speed rotation and thus is particularly suitably used in these instruments when the ball bearing is rotated at a high speed.

Hereinafter, the present invention will be further specifically described with reference to Examples. The present invention, however, is not limited to these Examples.

EXAMPLES

Example 1

70% by weight of polyetheretherketone (Victrex 150FP (trade name), manufactured by Victrex plc), 20% by weight of raw material graphite (CGB-50 (trade name), manufactured by Nippon Graphite Industries, Co., Ltd., average particle diameter D50=50 μm), and 10% by weight of a carbon fiber (HT-C702, manufactured by TEIJIN LIMITED) were blended in these amounts and mixed. The obtained mixture was formed into a molding material of a round bar with an injection molding machine. This molding material was subjected to a cutting to give the cage 64 having the shape illustrated in FIG. 4.

The cage 64 was observed with a digital microscope (VHX-6000, manufactured by KEYENCE CORPORATION). In other words, the observation region R in the sample C prepared as described above was observed in a magnification of 300 times to measure the maximum diameter and the area of each graphite particle. The ratio of the area occupied by the graphite having a maximum diameter of 30 μm or more relative to the total area occupied by the graphite in the observation region was 12%.

Figure 8:
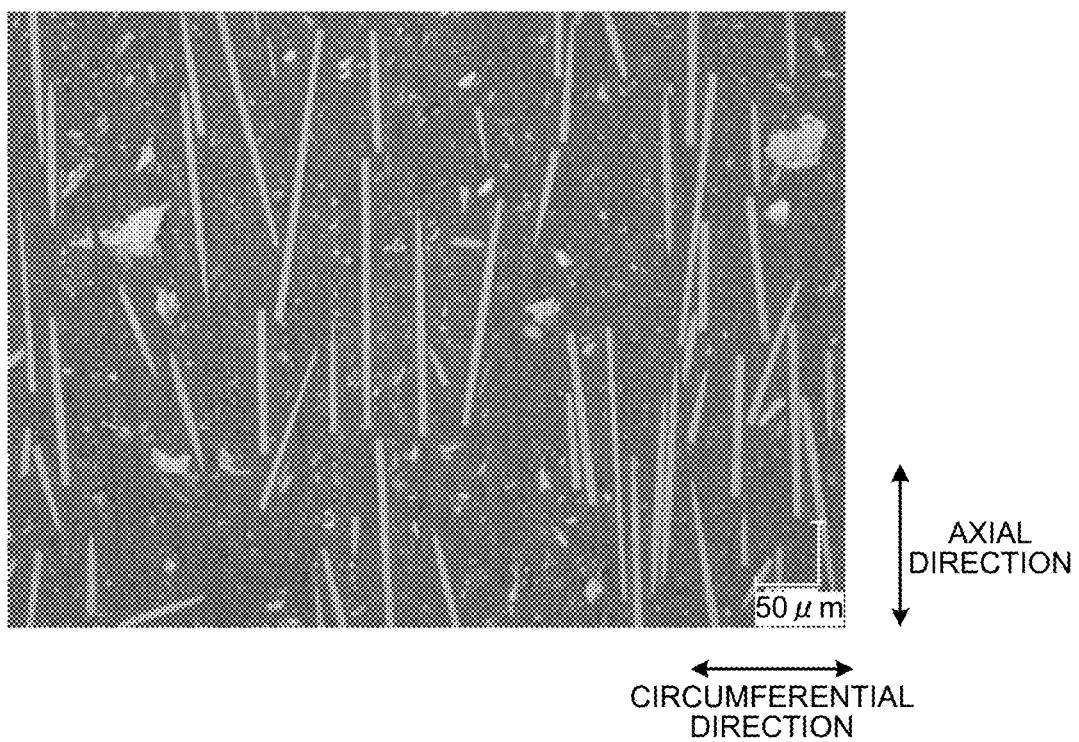
FIG. 8 is a view illustrating a microscope photograph with respect to the cage obtained in Example 1.

In addition, FIG. 8 illustrates a digital microscope photograph of a part of the observation region R in the sample C prepared from the cage obtained in Example 1. The carbon fiber is oriented in the sample C in a direction corresponding to the axial direction in the cage 64 before the sample C is prepared.

In Table 1, the blend ratio when the mixture was obtained and the ratio of the area occupied by the graphite having a maximum diameter of 30 μm or more are listed.

Example 2

The cage 64 was obtained in the same manner as the manner in Examples 1 except that 60% by weight of polyetheretherketone (Victrex 150FP (trade name), manufactured by Victrex plc), 20% by weight of raw material graphite (CGB-50 (trade name), manufactured by Nippon Graphite industries, Co., Ltd., average particle diameter D50=50 μm), and 20% by weight of a carbon fiber (HT-C702, manufactured by TEIJIN LIMITED) were blended in these amounts.

The cage 64 was observed with a digital microscope in the same manner as the manner in Example 1. The ratio of the area occupied by the graphite having a maximum diameter of 30 μm or more relative to the total area occupied by the graphite in the observation region was 10%.

Example 3

The cage 64 was obtained in the same manner as the manner in Examples 1 except that 60% by weight of polyetheretherketone (Victrex 150FP (trade name), manufactured by Victrex plc), 20% by weight of raw material graphite (CGB-50 (trade name), manufactured by Nippon Graphite Industries, Co., Ltd., average particle diameter D50=50 μm), 10% by weight of a carbon fiber (HT-C702, manufactured by TEIJIN LIMITED), and 10% by weight of polytetrafluoroethylene (KT-400M, manufactured by KITAMURA LIMITED) were blended in these amounts.

The cage 64 was observed with a digital microscope in the same manner as the manner in Example 1. The area ratio occupied by the graphite having a maximum diameter of 30 μm or more relative to the total area occupied by the graphite in the observation region was 14%.

Example 4

The cage 64 was obtained in the same manner as the manner in Examples 1 except that 60% by weight of polyetheretherketone (Victrex 150FP (trade name), manufactured by Victrex plc), 30% by weight of raw material graphite (CGB-50 (trade name), manufactured by Nippon Graphite industries, Co., Ltd., average particle diameter D50=50 μm), and 10% by weight of a carbon fiber (HT-C702, manufactured by TEIJIN LIMITED) were blended in these amounts.

The cage 64 was observed with a digital microscope in the same manner as the manner in Example 1. The area ratio occupied by the graphite having a maximum diameter of 30 μm or more relative to the total area occupied by the graphite in the observation region was 19%.

Example 5

The cage 64 was obtained in the same manner as the manner in Examples 1 except that 70% by weight of polyetheretherketone (Victrex 150FP (trade name), manufactured by Victrex plc), 10% by weight of raw material graphite (CGB-50 (trade name), manufactured by Nippon Graphite Industries, Co., Ltd., average particle diameter D50=50 μm), and 20% by weight of a carbon fiber (HT-C702, manufactured by TEIJIN LIMITED) were blended in these amounts.

The cage 64 was observed with a digital microscope in the same manner as the manner in Example 1. The area ratio occupied by the graphite having a maximum diameter of 30 μm or more relative to the total area occupied by the graphite in the observation region was 11%.

Example 6

The cage 64 was obtained in the same manner as the manner in Examples 1 except that 80% by weight of polyetheretherketone (Victrex 150FP (trade name), manufactured by Victrex plc), 10% by weight of raw material graphite (CGB-50 (trade name), manufactured by Nippon Graphite Industries, Co., Ltd., average particle diameter D50=50 μm), and 10% by weight of a carbon fiber (HT-C702, manufactured by TEIJIN LIMITED) were blended in these amounts.

The cage 64 was observed with a digital microscope in the same manner as the manner in Example 1. The area ratio occupied by the graphite having a maximum diameter of 30 μm or more relative to the total area occupied by the graphite in the observation region was 15%.

Example 7

The cage 64 was obtained in the same manner as the manner in Examples 1 except that 70% by weight of polyetheretherketone (Victrex 150FP (trade name), manufactured by Victrex plc), 25% by weight of raw material graphite (CGB-50 (trade name), manufactured by Nippon Graphite industries, Co., Ltd., average particle diameter D50=50 μm), and 5% by weight of a carbon fiber (HT-C702, manufactured by TEIJIN LIMITED) were blended in these amounts.

The cage 64 was observed with a digital microscope in the same manner as the manner in Example 1. The area ratio occupied by the graphite having a maximum diameter of 30 μm or more relative to the total area occupied by the graphite in the observation region was 20%.

Example 8

The cage 64 was obtained in the same manner as the manner in Examples 1 except that 70% by weight of polyetheretherketone (Victrex 150FP (trade name), manufactured by Victrex plc), 10% by weight of raw material graphite (CGB-50 (trade name), manufactured by Nippon Graphite Industries, Co., Ltd., average particle diameter D50=50 µm), 10% by weight of a carbon fiber (HT-C702, manufactured by TEIJIN LIMITED), and 10% by weight of polytetrafluoroethylene (KT-400M, manufactured by KITAMURA LIMITED) were blended in these amounts.

The cage 64 was observed with a digital microscope in the same manner as the manner in Example 1. The area ratio occupied by the graphite having a maximum diameter of 30 µm or more relative to the total area occupied by the graphite in the observation region was 11%.

Example 9

As the polyetherketone-based resin, a copolymer containing the structure unit represented by the above formula (1) and the structure unit represented by the above formula (2) (melting point: 370° C. or more, glass transition point: 150° C. or more, KetaSpire (registered trademark) PEEK XT, manufactured by Solvay S.A.) was used. The cage 64 was obtained in the same manner as the manner in Examples 1 except that 70% by weight of the above copolymer, 20% by weight of raw material graphite (CGB-50 (trade name), manufactured by Nippon Graphite Industries, Co., Ltd., average particle diameter D50=50 µm), and 10% by weight of a carbon fiber (HT-C702, manufactured by TEIJIN LIMITED) were blended in these amounts.

The cage 64 was observed with a digital microscope in the same manner as the manner in Example 1. The area ratio occupied by the graphite having a maximum diameter of 30 µm or more relative to the total area occupied by the graphite in the observation region was 13%.

Comparative Example 1

The cage 64 was obtained in the same manner as the manner in Examples 1 except that 70% by weight of polyetheretherketone (Victrex 150FP (trade name), manufactured by Victrex plc), 10% by weight of a carbon fiber (HT-C702, manufactured by TEIJIN LIMITED), and 20% by weight of polytetrafluoroethylene (KT-400M, manufactured by KITAMURA LIMITED) were blended in these amounts.

Comparative Example 2

The cage 64 was obtained in the same manner as the manner in Examples 1 except that 60% by weight of polyetheretherketone (Victrex 150FP (trade name), manufactured by Victrex plc), 10% by weight of raw material graphite (JCPB (trade name), manufactured by Nippon Graphite Industries, Co., Ltd., average particle diameter D50=5 µm), 20% by weight of graphite (CGB-20 (trade name), manufactured by Nippon Graphite Industries, Co., Ltd., average particle diameter D50=20 µm), and 10% by weight of a carbon fiber (HT-C702, manufactured by TEIJIN LIMITED) were blended in these amounts.

The cage 64 was observed with a digital microscope in the same manner as the manner in Example 1. The area ratio occupied by the graphite having a maximum diameter of 30 µm or more relative to the total area occupied by the graphite in the observation region was 6%.

Figure 9:
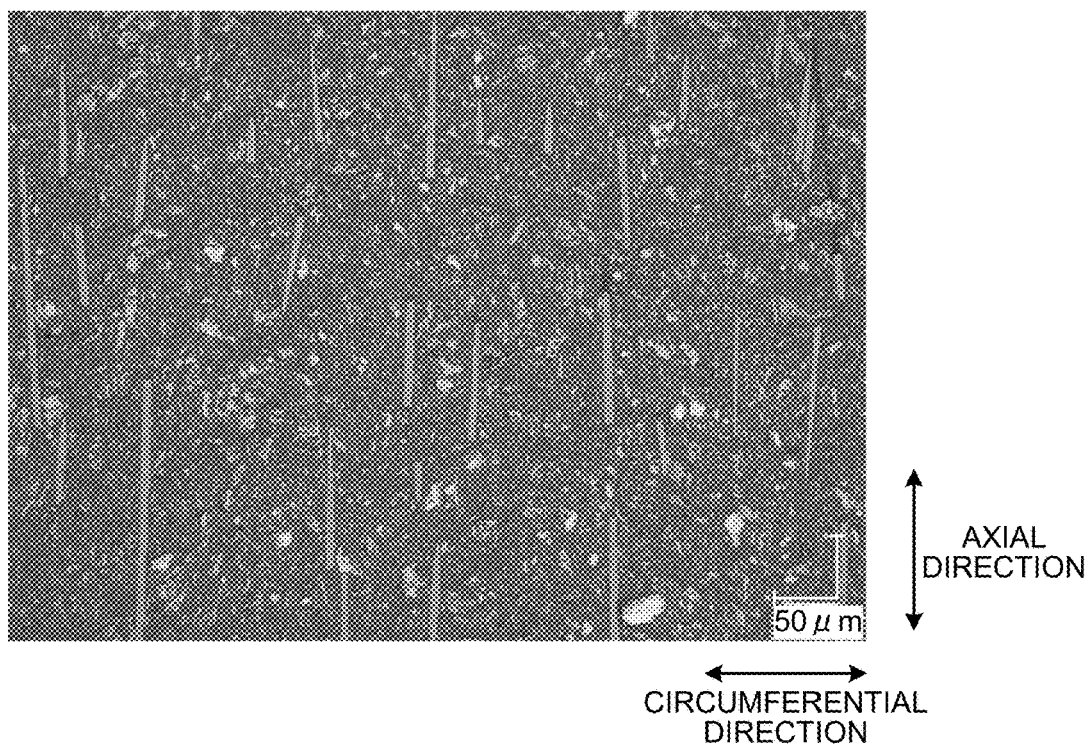
FIG. 9 is a view illustrating a microscope photograph with respect to the cage obtained in Comparative Example 2.

In addition, FIG. 9 illustrates a digital microscope photograph of a part of the observation region R in the sample C prepared from the cage obtained in Comparative Example 2.

Comparative Example 3

The cage 64 was obtained in the same manner as the manner in Examples 1 except that 50% by weight of polyetheretherketone (Victrex 150FP (trade name), manufactured by Victrex plc), 20% by weight of raw material graphite (CGB-20 (trade name), manufactured by Nippon Graphite Industries, Co., Ltd., average particle diameter D50=20 µm), and 30% by weight of a carbon fiber (HT-C702, manufactured by TEIJIN LIMITED) were blended in these amounts.

The cage 64 was observed with a microscope in the same manner as the manner in Example 1. The area ratio occupied by the graphite having a maximum diameter of 30 µm or more relative to the total area occupied by the graphite in the observation region was 0.4%.

Comparative Example 4

The cage 64 was obtained in the same manner as the manner in Examples 1 except that 50% by weight of polyetheretherketone (Victrex 150FP (trade name), manufactured by Victrex plc), 40% by weight of raw material graphite (CGB-50 (trade name), manufactured by Nippon Graphite Industries, Co., Ltd., average particle diameter D50=50 µm), and 10% by weight of a carbon fiber (HT-C702, manufactured by TEIJIN LIMITED) were blended in these amounts.

The cage 64 was observed with a microscope in the same manner as the manner in Example 1. The area ratio occupied by the graphite having a maximum diameter of 30 µm or more relative to the total area occupied by the graphite in the observation region was 24%.

Comparative Example 5

A cage constituted by commercially available 450FC30 manufactured by Victrex plc, in which polyetheretherketone is used as a base rein was used.

The cage 64 was observed with a microscope in the same manner as the manner in Example 1. The area ratio occupied by the graphite having a maximum diameter of 30 µm or more relative to the total area occupied by the graphite in the observation region was 8%.

Comparative Example 6

A cage constituted by a commercially available TORLON material (registered trademark TORLON) manufactured by Solvay Specialty Polymers Italy SpA, in which polyamide-imide is used as a base rein was used.

TABLE 1

| | Blend ratio [% by weight] | | | | | | |
|---|---|---|---|---|---|---|---|
| | | Graphite | | | | | |
| | Polyetheretherketone | Average particle diameter D50 = 5 μm | Average particle diameter D50 = 20 μm | Average particle diameter D50 = 50 μm | Carbon fiber | Polytetrafluoroethylene | Area ratio (*1) |
| Example 1 | 70 | | | 20 | 10 | 0 | 12 |
| Example 2 | 60 | | | 20 | 20 | 0 | 10 |
| Example 3 | 60 | | | 20 | 10 | 10 | 14 |
| Example 4 | 60 | | | 30 | 10 | 0 | 19 |
| Example 5 | 70 | | | 10 | 20 | 0 | 11 |
| Example 6 | 80 | | | 10 | 10 | 0 | 15 |
| Example 7 | 70 | | | 25 | 5 | 0 | 20 |
| Example 8 | 70 | | | 10 | 10 | 10 | 11 |
| Example 9 | 70 (*3) | | | 20 | 10 | | 13 |
| Comparative Example 1 | 70 | | | | 10 | 20 | |
| Comparative Example 2 | 60 | 10 | 20 | | 10 | 0 | 6 |
| Comparative Example 3 | 50 | | 20 | | 30 | 0 | 0.4 |
| Comparative Example 4 | 50 | | | 40 | 10 | 0 | 24 |
| Comparative Example 5 | 70 | | 10 (*2) | | 10 | 10 | 8 |

(*1) Area ratio: An area ratio occupied by graphite having a maximum diameter of 30 μm or more relative to the total area occupied by graphite in the observation area
(*2) Particle diameters of graphite at the time of addition are unknown
(*3) Copolymer (PEEK-XT)

<Evaluation Methods and Results>
[Durability Test]

The dental handpiece into which the cage was incorporated was operated by compressed air having a predetermined pressure to rotate the ball bearing. A cycle in which the rotation state was maintained for a certain period with a load being applied and thereafter the rotation was stopped was repeated and the number of rotations was measured. More specifically, the rotation test with the load was performed at the initial rotation speed of the ball bearing of about 400,000 rpm. In this test, one cycle was set to two minutes. During one cycle, a load of 2 N to 4 N was repeatedly applied to the tip of the tool during rotation 30 times in one minute and thereafter the rotation speed at the time of rotation without the load was measured for one minute. The point of time when the measured rotation speed was decreased by 10% or more of the initial rotation speed was determined to be the lifetime.

Figure 10:
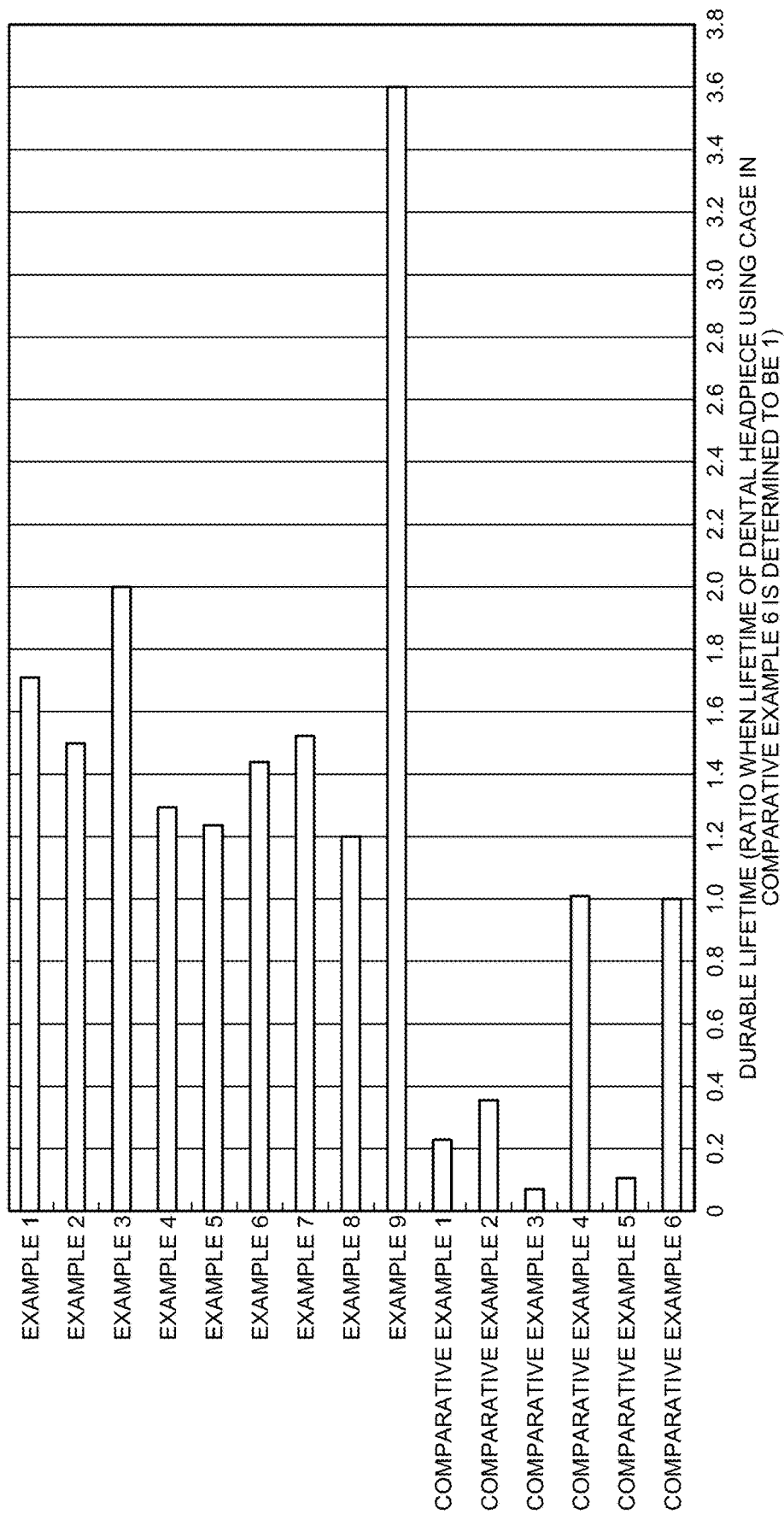
FIG. 10 is a graph illustrating the results of durability test.

FIG. 10 is a graph illustrating the result of the durability test. Each bar represents the averaged value of the results of the durability test performed five times. The horizontal axis represents the lifetime when the lifetime of the dental handpiece using the cage, in which the base resin is the commercially available polyamideimide material, in Comparative Example 6 is determined to be 1 It is found that the lifetime of the dental handpiece using the cage formed of the commercially available polyetheretherketone material in Comparative Example 5 is remarkably short. The dental handpieces using the cages formed of the polyetheretherketone materials in Comparative Examples 1, 2, and 3 also have short lifetimes as compared to the lifetime of the dental handpieces using the cage in Comparative Example 6. On the other hand, it is found that the dental handpieces using the cages formed of the polyetheretherketone materials in Examples 1 to 9 have long lifetimes as compared to the lifetime of the dental handpieces using the cage in Comparative Example 6. From the above results, it is found that use of the cages prepared in Examples allows the ball bearings having longer lifetime to be obtained.

The lifetime of the dental handpiece using the cage formed of the polyetheretherketone materials in Comparative Example 4 has a similar lifetime to the lifetime of the dental handpiece using the cage in Comparative Example 6. Sufficient tensile strength of the cage in Comparative example 4, however, cannot be obtained as described below.

[Autoclave Test]

A cycle in which the material processed in the shape of the cage 64 was allowed to stand under an environment of a temperature of 132° C. and a humidity of 100% RH for 10 minutes and thereafter dried at 100° C. for 20 minutes was determined to be one cycle. This cycle was repeated to 2,500 times at maximum and tensile strength was measured at every specified number of cycle times.

Figure 11:
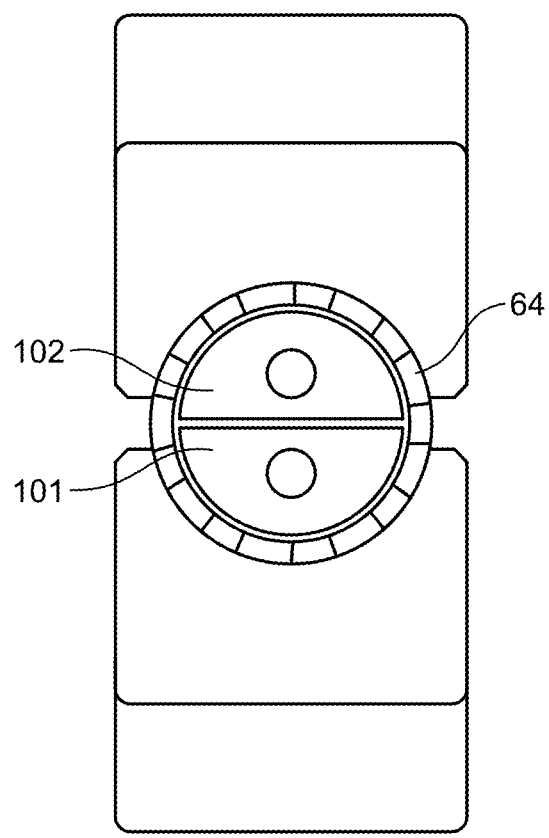
FIG. 11 is a view illustrating a method for measuring the tensile strength of the cage.

The tensile strength of the cage 64 was measured as follows. As illustrated in FIG. 11, two jigs of semilunar cross sections 101 and 102 were attached to the inner diameter of the cage 64. The lower jig 101 was fixed and the other jig 102 was pulled in the upper direction until the cage 64 was broken to determine the load at the time of break to be the tensile strength.

Figure 12:
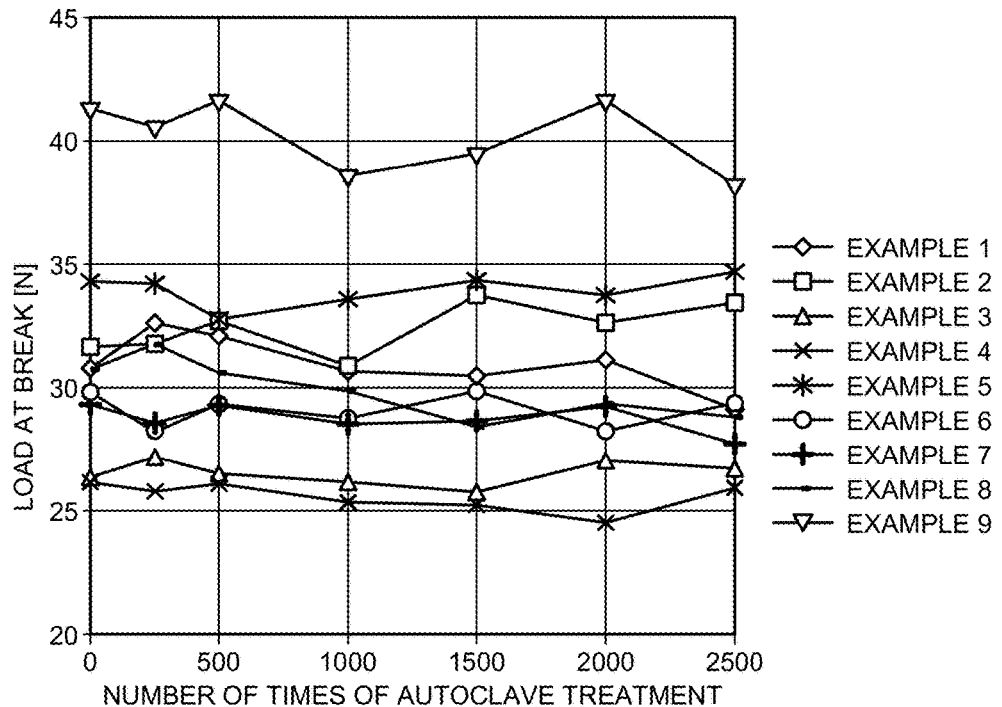
FIG. 12 is a graph illustrating the results of an autoclave test.
Figure 13:
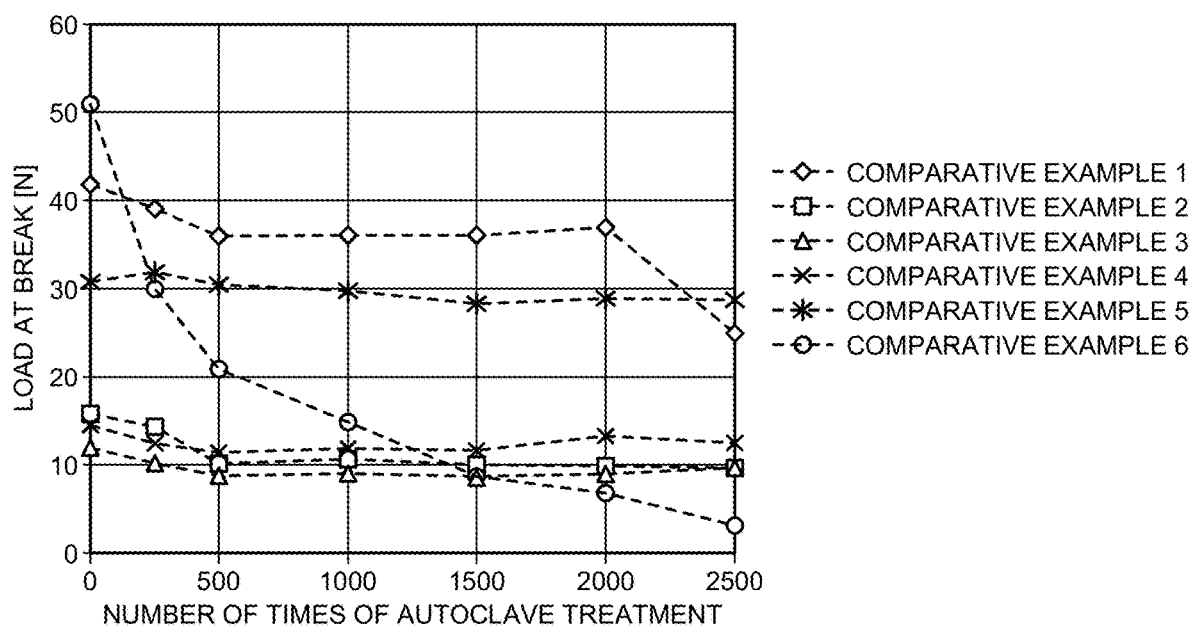
FIG. 13 is a graph illustrating the results of the autoclave test.

FIG. 12 and FIG. 13 are graphs illustrating the results of the autoclave test. The vertical axis represents the tensile strength obtained by the above-described tensile test and the horizontal axis represents the number of times of the autoclave treatment at the time of performing this tensile test. In Comparative Example 6 using the polyamideimide, it is found that the tensile strength becomes lower as the number of times of the autoclave treatment increases. On the other hand, it is found that when the cages prepared in Examples 1 to 9 were used, the tensile strength is retained even when the number of times of the autoclave treatment increased and thus these cages can retain the excellent strength even under the high temperature and high humidity environment. In the Comparative Example 5 using the commercially available polyetheretherketone, the tensile strength is retained even when the number of times of the autoclave treatment increases. The lifetime in the durability test, however, is short as described above. In Comparative Examples 1 to 4, the tensile strength is retained. The initial strength, however, is insufficient.

Table 2 lists the above test result. In the column of "Durable lifetime", the test result equal to or longer than the durable lifetime in Comparative Example 6 is determined to be "Long" whereas the test result shorter than the durable lifetime in Comparative Example 6 is determined to be "Short". In the column of "Initial strength", the test result being not lower than the initial strength in Comparative Example 5 by 5 N or more is determined to be "Acceptable", whereas the test result being 5 N or much lower than the initial strength in Comparative Example 5 is determined to be "Unacceptable". In the column of "Change in strength due to autoclave test", the test result in which the strength when the number of times of the autoclave treatment is 2,500 times is not lower than the initial strength by 10 N or more is determined to be "Retained", whereas the test result being 10 N or much lower than the initial strength is determined to be "Not retained". It is found that the cages in which sufficient initial strength is retained even when the number of times of the autoclave treatment increases and, at the same time, the durable lifetime is long are only the cages in Examples 1 to 9.

TABLE 2

|  | Durable lifetime | Initial strength | Change in strength due to autoclave test |
| --- | --- | --- | --- |
| Example 1 | Long | Acceptable | Retained |
| Example 2 | Long | Acceptable | Retained |
| Example 3 | Long | Acceptable | Retained |
| Example 4 | Long | Acceptable | Retained |
| Example 5 | Long | Acceptable | Retained |
| Example 6 | Long | Acceptable | Retained |
| Example 7 | Long | Acceptable | Retained |
| Example 8 | Long | Acceptable | Retained |
| Example 9 | Long | Acceptable | Retained |
| Comparative Example 1 | Short | Acceptable | Not retained |
| Comparative Example 2 | Short | Unacceptable | Retained |
| Comparative Example 3 | Short | Unacceptable | Retained |
| Comparative Example 4 | Long | Unacceptable | Retained |
| Comparative Example 5 | Short | Acceptable | Retained |
| Comparative Example 6 | Long | Acceptable | Not retained |

According to one embodiment of the present invention, the ball bearing including the cage that reduce strength deterioration under a high temperature and high humidity environment while required strength is being secured and, in addition, has long lifetime can be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A ball bearing comprising:
an inner ring;
an outer ring placed outside of the inner ring;
a plurality of rolling bodies intervening between the inner ring and the outer ring; and
an annular cage having a rotation axis, the cage including pockets rotatably holding the rolling bodies in a circumferential direction at intervals, wherein
the cage comprises a resin composition comprising a polyetherketone-based resin, graphite, and a carbon fiber;
the resin composition comprises the polyetherketone-based resin in an amount of 60% by weight or more and 80% by weight or less, the graphite in an amount of 10% by weight or more and 30% by weight or less, and the carbon fiber in an amount of 5% by weight or more and 20% by weight or less when the entire resin composition is determined to be 100% by weight; and
an area ratio is defined by a ratio of an area occupied by graphite having a diameter of a circle to which a particle internally contacts of 30 μm or more relative to a total area occupied by the graphite,
wherein the area ratio is 10% to 20%.

2. The ball bearing according to claim 1, wherein the polyether ketone-based resin has a melting point of 370° C. or more and a glass transition point of 150° C. or more.

3. The ball bearing according to claim 1, wherein the polyetherketone-based resin comprises polyetheretherketone.

4. The ball bearing according to claim 1, wherein the polyetherketone-based resin comprises a copolymer containing a structure unit represented by a following formula (1) and a structure unit represented by a following formula (2):

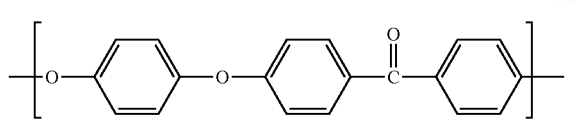

(1)

(2)

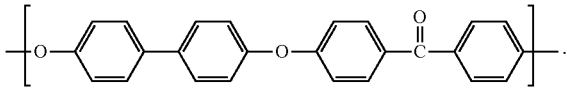

5. The ball bearing according to claim 4, wherein 50 mol% or more of the structure unit represented by the above formula (2) is contained in 100 mol% of the structure units constituting the copolymer.

6. The ball bearing according to claim 5, wherein the copolymer has a melting point of 370° C. or more and a glass transition point of 150° C. or more.

7. The ball bearing according to claim 1, wherein the carbon fiber is oriented in a direction corresponding to the axial direction in the cage.

* * * * *